US008572678B2

(12) United States Patent
Barnett et al.

(10) Patent No.: US 8,572,678 B2
(45) Date of Patent: Oct. 29, 2013

(54) SECURITY POLICY FLOW DOWN SYSTEM

(75) Inventors: Bruce Barnett, Troy, NY (US); Scott Evans, Burnt Hills, NY (US); Robert James Mitchell, Jr., Waterford, NY (US); Thomas Markham, Niskayuna, NY (US); Stephen Dill, Frederick, MD (US); Vincent Hannon, Niskayuna, NY (US); John Patrick Elliott, Annandale, VA (US); Andrew Crapo, Scotia, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 89 days.

(21) Appl. No.: 13/336,737

(22) Filed: Dec. 23, 2011

(65) Prior Publication Data
US 2013/0167191 A1  Jun. 27, 2013

(51) Int. Cl.
G06F 21/00 (2013.01)
(52) U.S. Cl.
USPC .................................. 726/1; 726/25
(58) Field of Classification Search
USPC ....................................... 726/25, 1
See application file for complete search history.

(56) References Cited

U.S. PATENT DOCUMENTS 8,032,557 B1 * 10/2011 Vijendra et al. ............. 707/783
2007/0101432 A1 * 5/2007 Carpenter ..................... 726/25

OTHER PUBLICATIONS

Lymberopoulos, Leonidas, Emil Lupu, and Morris Sloman. "Ponder policy implementation and validation in a CIM and differentiated services framework."Network Operations and Management Symposium, 2004. NOMS 2004. IEEE/IFIP. vol. 1. IEEE, 2004.*

* cited by examiner

Primary Examiner — Kambiz Zand
Assistant Examiner — Michael Guirguis
(74) Attorney, Agent, or Firm — Ronald E. Prass, Jr.; Prass LLP

(57) ABSTRACT

A system and method are provided that distill an organization's information security plan into a detailed and unambiguous security object model. The developed security object model provides a visualization of complex relationships between individual elements and levels that is usable to carry into effect the organization's information security plan. Configuration control and a verifiable level of security compliance are provided through implementation of the organization's information security plan by the developed security object model. The developed security object model is hosted on a computing platform in communication with at least the organization's network to provide information security plan compliance, configuration control and gap analysis in a usable form to the organization.

23 Claims, 7 Drawing Sheets

SECURITY POLICY FLOW DOWN SYSTEM

BACKGROUND

1. Field of the Disclosed Embodiments

This disclosure relates to systems and methods for implementing an automated security policy for an organization, particularly through implementing a semantic model in a formal modeling language such as Unified Modeling Language Model (UML), Web Ontology Language (OWL), Semantic Application Design Language (SADL), a controlled-English language that maps directly into OWL, or any other semantic language capable of capturing the instances, classes, and relationships of the security domain in such a way as to render the model computable.

2. Related Art

The information security of an organization is generally governed at the highest levels by the existence of policies, guidelines and standards. These policies, guidelines and standards are generally provided in written form. One or more individuals in the organization are then tasked with developing information security procedures, requirements and, in many cases, specific configurations for information security policy implementation and enforcement. Within this structure also decision points are often established in order to determine whether the organization's security infrastructure is meeting the organization's security needs.

Conventionally, the implementation of information security with an organization is largely human dependent. In this regard, the establishment and enforcement of an information security policy is subject to specific interpretation. In general, there does not exist a comprehensive framework for capturing, for instance, relationships between overarching policy objectives and specific security implementation guidelines. Security policy implementation within an organization, therefore, tends to be undertaken on an ad hoc basis.

In conventional implementations, a corporate policy is drafted by senior members of the organization. The corporate policy drives development of specific business policies. Business guidelines and standards are then generally relied upon to shape security requirements. Standard operating procedures may then be developed to enforce compliance requirements on appropriate devices within the organization's information sharing network. It is rare that the senior members of a corporation structure the corporate policy then draft the security requirements or the standard operating procedures. Rather, other members of the organization interpret the corporate policy to establish certain guidelines for the particular business of the organization. Within the framework of the business guidelines, security requirements are established. The security requirements are then interpreted, by perhaps another group of individuals, to produce a specific information security configuration for the organization.

The lack of a comprehensive framework makes it difficult for the individuals tasked with implementing, overseeing and enforcing information security policy to ensure, with any degree of confidence, that the security infrastructure properly reflects the organization's overall goals and objectives. This difficulty is exacerbated in the all-too-often occurrence where a change in certain situational factors dictates some shift in the security posture of the organization. Absent an overarching framework, it is difficult for any individual or group to first visualize, and then analyze, an overall impact of potential changes.

This difficulty becomes even more acute in instances where, for example, security policies are intended to be shared between organizations. In these situations, where it is important to ensure that data flow between organizations remains secure, it is often important to ensure that security procedures and implementations in all participating organizations are comparable and compatible.

The current manual process, overseen by the specified individual(s) suffers from a number of significant drawbacks in meeting the above objectives. Even in small single organization implementations, the ultimate security configurations are oftentimes unverifiable. A very basic difficulty exists in interpretation of the terminology used in preparing and interpreting policies, guidelines, standards, procedures, requirements, and ultimately configurations for the security policy implementations. A small organization may have only one individual who is tasked with overseeing security policy implementation through the manual process. The manual process, however, requires that the terms that are used in establishing the policy, generating guidelines, and distilling the security requirements be independently interpreted by that individual who is tasked with setting the security configuration. Unfortunately, within this task of interpretation, there exists an unavoidable level of semantic ambiguity. This semantic ambiguity often then leads to differing interpretations of the requirements and the configuration by even a small group of individuals tasked with carrying out the security implementation, or between the individual noted above who is tasked with carrying into effect the security policy today, and that individual's successor.

As organizations grow in size and the numbers of people and network components increase significantly, changes in configuration, required updates and specific maintenance to individual network components may go largely untracked other than with regard to a single specific component that is being re-configured, updated or fixed. In a comprehensive network environment, changes, updates and maintenance of components at a specific level in the organization may be undertaken in a manner disconnected from corresponding changes, updates and maintenance at other levels in the organization. A result is that a specific change in configuration, update or fix may not be adequately managed network wide. An impact of a specific change in configuration, update or fix, which could have a significant effect on other levels of the organizational infrastructure, may be implemented without a complete assessment regarding the significance of that effect.

A reliance on individual humans in the loop further then suffers because there is incomplete, if any, detailed turnover from one individual to the next regarding a specific interpretation of what a particular term in a particular security configuration entails. Simply put, different individuals, without detailed guidance, which is often non-existent, will likely interpret a large number of terms in a security policy implementation in different ways leading to potentially vast differences in implementation of the security policy. Significant difficulties are then encountered in verification of the security policy implementation as those metrics are then themselves open to broad interpretation. The manual process, therefore, requires a level of expert intuition for completeness. Even with that expert intuition, however, a measurable level of consistency in the manual process remains largely unachievable.

For the above reasons, security policy implementations within organizations, or across organizational lines where required, end up being subject to significant interpretation leading to wide variability in carrying out security policies. With increasing levels of sophistication in security infrastructures, these shortfalls become magnified. As such, the outcome of the security policy implementation may be decidedly different from what was intended.

Modeling tools exist that can implement and track specified sets of instructions for task accomplishment. Automated manufacturing and automated inventory control employ such modeling tools. These modeling tools are implemented in a manner that leaves little room for interpretation. In the case of automated manufacturing, this leads to repeatable outcomes in the details of the manufactured articles. If room existed for interpretation of a specification for a manufactured article, it is likely that unacceptable variations in the manufactured article would be introduced. In like manner, in the case of automated inventory control, if there were room for interpretation, inventory management would quickly suffer.

SUMMARY OF THE DISCLOSED EMBODIMENTS

In view of the above shortfalls in conventional security policy implementations, it would be advantageous to provide a model and a system by which critical elements and relationships in a flow down from security policy to security guidelines to security standards and ultimately to implemented security configurations in a particular security environment could be captured. An objective would be to establish an extensible framework that facilitates further analysis, visualization and verification of the flow down as a reusable tool to ensure that security policies are properly defined, and equally as properly enforced in a manner that is consistently verifiable.

In various exemplary embodiments, the systems and methods according to this disclosure may provide a comprehensive model of the flow down from security policy to security implementation.

In various exemplary embodiments, systems and methods according to this disclosure may advantageously employ a standardized general purpose model using, for example, Unified Modeling Language (UML) or Web Ontology Language (OWL) to produce the above-described comprehensive model of flow down. UML is a standardized modeling language employed in object-oriented software engineering. Details of a specific UML implementation for the comprehensive model discussed in this disclosure will be limited only to those necessary to adequately explain implementation of an exemplary UML model for the security policy composition discussed in this disclosure. Likewise, OWL is a World Wide Web Consortium (W3C) recommended ontology language based on set theory and first-order logic. OWL has the advantage of having a formal model theory and a formal model proof theory, making automated reasoning over OWL models both possible and well-defined.

In various exemplary embodiments, the systems and methods according to this disclosure may provide the above-described comprehensive model as an extensible framework within which specific relationships within the flow down from the security policy to the security policy implementation may be visualized and analyzed. In this manner, an impact of potential changes to individual components in the network system to which the security policy implementation is applied may be more quickly evaluated across the entire network security policy implementation.

In various exemplary embodiments, the systems and methods according to this disclosure may provide an organization with an ability to verify, and ultimately provide proof, that the organization's security policies are being completely enforced. Ability to provide such proof may benefit the organization in dealing with customer entities and agencies such as, for example, government entities and the military for which verification of security policy implementation may be important.

In various exemplary embodiments, the systems and methods according to this disclosure may provide a user organization with an ability to adapt its security policy and enforcement procedures in a much more agile manner to the emergence of new threats or requirements for expansion of its network capacity to include additional devices, domains and communications pathways.

In various exemplary embodiments, the systems and methods according to this disclosure may provide a level of standardization that may benefit the organization and its customer agencies. Advantages of such standardization would be to provide an easily verifiable security capability than could be quickly accredited according to a defined standard.

In various exemplary embodiments, the systems and methods according to this disclosure may provide an extensible semantic framework by which to represent relationships between security policy requirements and security enforcement points.

In various exemplary embodiments, the systems and methods according to this disclosure may provide a vehicle by which to organize security-related components, such as, for example, policy enforcement points (PEPs) and policy decision points (PDPs), security policies, guidelines and security-oriented actions into the scorecard framework.

In various exemplary embodiments, the systems and methods according to this disclosure may provide an extensible object model that can represent policy decisions, threats, mitigations and their relationships to PDP/PEP configurations.

The systems and methods according to this disclosure present a solution that may provide benefits to the user organization including: (1) providing all security documents and inter-connections in one place; (2) enabling the user organization to capture and visualize the complex relationships of the security structure represented by the object model; (3) enabling the user organization to detect inconsistencies or gaps in its security policy implementation; and (4) providing an integrated view of the security infrastructure to each individual tasked with security oversight within the organization.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for implementing an automated security policy for an organization will be described, in detail, with reference to the following drawings, in which.

DETAILED DESCRIPTION OF THE DISCLOSED EMBODIMENTS

The systems and methods for implementing an automated security policy for an organization according to this disclosure will generally refer to this specific utility for those systems and methods. Exemplary embodiments described and depicted in this disclosure should not be interpreted as being specifically limited to any particular system or model configuration.

Individual features and advantages of the disclosed systems and methods will be set forth in the description that follows, and will be, in part, obvious from the description, or may be learned by practice of the features described in this disclosure. The features and advantages of the systems and methods according to this disclosure may be realized by means of the individual elements and combinations of those elements as particularly pointed out in the appended claims. While specific implementations are discussed, it should be understood that this is done for illustration purposes only. A person skilled in the relevant art will recognize that other components and configurations may be used without departing from the spirit and scope of the subject matter of this disclosure.

Various aspects of the disclosed embodiments relate to a system and a method for implementing an automated security policy for an organization, as well as to a corresponding computer-readable medium on which may be recorded a non-transitory program for carrying into effect the disclosed method and/or model.

The disclosed embodiments may be advantageously operated in a local computing environment in which a security policy has been or will be established.

Figure 1:
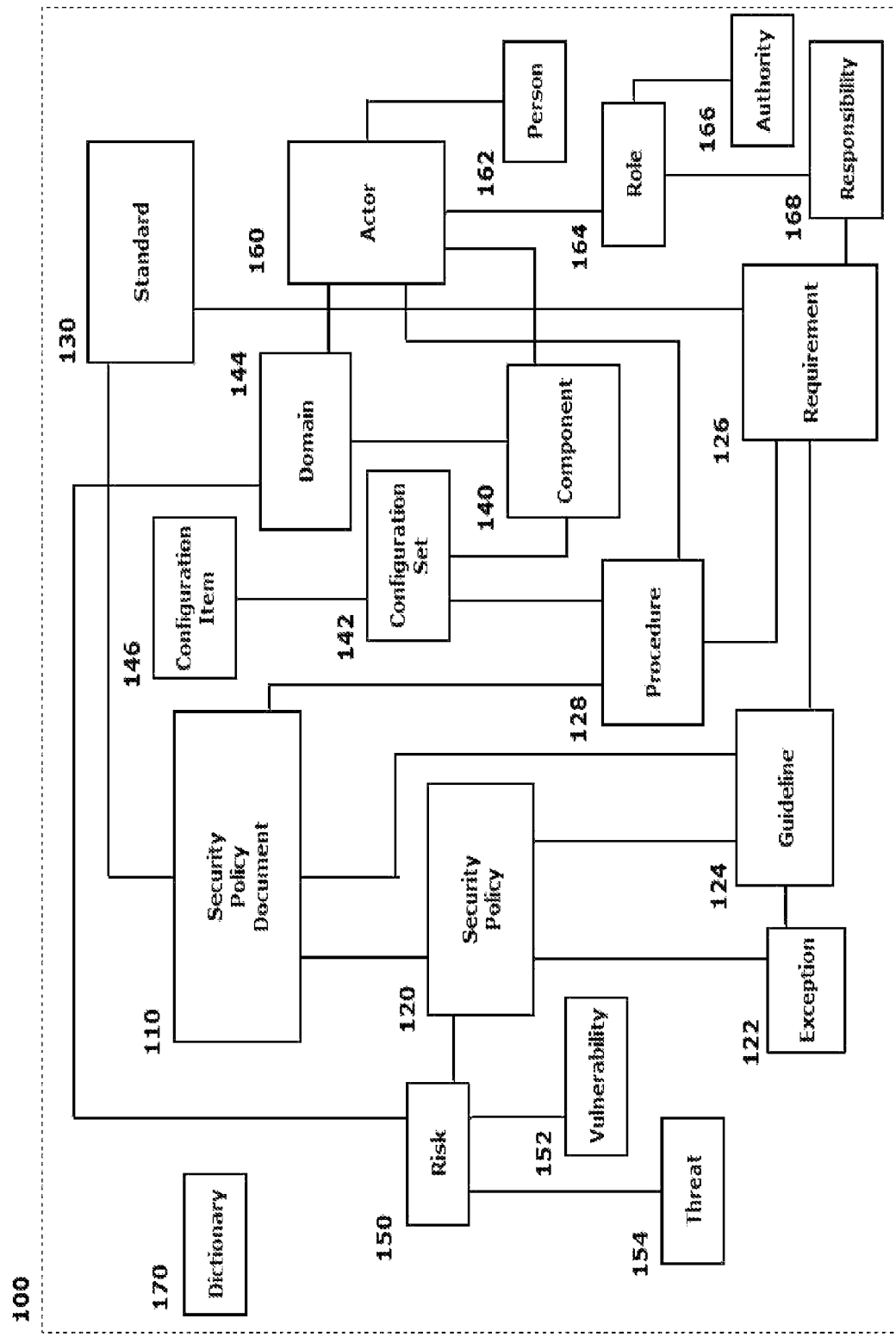
FIG. 1 illustrates a block diagram of an exemplary framework for an object model according to this disclosure.

FIG. 1 illustrates a block diagram of an exemplary framework 100 for an object model according to this disclosure. As is indicated above, an object model may be implemented in UML, a standardized modeling language employed in object-oriented software engineering; in OWL, a formal ontology language; or in any other formal semantic modeling language. Details of a specific UML implementation for the comprehensive model discussed in this disclosure will be limited only to those necessary to adequately explain implementation of an exemplary UML model for the security policy composition discussed in this disclosure. It should be noted, however, that the systems and methods discussed in this disclosure are not limited to an object model employing UML.

The exemplary framework 100 may include a dictionary 170 in order that the object model may be provided with a baseline of certain definitions of terms that the object model can employ as a reference.

The exemplary framework 100 is based around a security policy document 110. The security policy document 110 provides the overarching policy basis by which the object model may be carried into effect. Details of the security policy document 110, as well as other components depicted in FIG. 1, are shown and described in greater detail with appropriate UML object model relationships in FIGS. 2-5. FIGS. 2-5 include additional details of for example a class diagram in UML. These details are included for ease of understanding and are not provided in FIG. 1, because such details would render this figure too cumbersome. Again, it must be noted, however, that specific references to UML are included for ease of understanding and are not intended to be by way of limitation.

A security policy 120 may list, in a non-ambiguous manner, policy rules to address a specific risk 150. The security policy 120 may have associated with it certain exceptions 122. These exceptions 122 may represent deviations from the security policy 120 that are beyond the scope of the overall security policy implementation to manage, at all, or in what is determined by the organization to be a reasonable manner. The exceptions 122, however, will be specifically defined in order that the organization has a clear indication of specific exceptions 122 from the security policy 120.

The security policy 120 then flows down to one or more guidelines 124 for each of the listed policy rules in the security policy 120. Each of these guidelines 124 may also be tied to one or more exceptions 122. The guidelines 124 may also be presented in a list format each associated with a specific purpose in order to carry into effect the security policy 120. Like the security policy 120, guidelines 124 are part of the security policy document 110.

Each of the guidelines 124 may identify a specific type of requirement 126. These requirements 126 may generally comprise specific statements regarding necessary steps to carry into effect one or more specific guidelines 124. For each requirement 126, a responsibility 168 for carrying into effect the requirements 126 may also be defined.

For the requirements 126, one or more procedures 128 may be specifically defined for carrying the specific requirement 126 into effect on a particular component 140, as will described in more detail below. The procedures 128 will generally be specified by name and be generally directed at a specific configuration set 142 within the network. Each configuration set 142 will be identified by name. The one or more procedures 128 also comprise a part of the security policy document 110.

The requirements 126 will also lead to setting of certain specific standards 130. These standards 130 like security policy 120, security guidelines 124 and procedures 128 will be part of the security policy document 110. There is likely no reason, in this regard for the security policy document 110 to include the requirements 128.

The security policy 120 is established responsive to a specific level of risk 150. The level of risk 150 is assessed, or otherwise defined, based on a particular threat 154 and an assessed vulnerability 152 of the particular network to the threat 154. Risks 150 will be associated with specific domains 144 in the network environment.

The domains 144 will have associated with them specific components 140. It is these components 140 that will require configuration sets 142 in order to individually ultimately carry into effect the overarching security policy 120.

The specific components 140 will have sets of configurations 142 associated with them. These sets of configurations are a compilation of individual configuration items 146 for the specific component 140 that is subject to configuration, update and/or maintenance. When this occurs, the procedure 128 may be implemented via the configuration set 142 in order that monitoring and control is maintained.

The individual component 140 is an example of an actor 160 that may be specified by name. The actor 160 will have a specific role 164 associated with a particular responsibility 168. The actor 160 may be specified by name as a particular person 162. Associated with the role 164 will be a specific level of authority 166 to be defined.

For each of the specific levels and identified portions of the exemplary framework 100, it is intended that the distilled flow down process will provide a basis by which an automated system may establish security policy management in a manner that can be adequately visualized and further analyzed, particularly as changes are implemented.

An objective of the implementation of the object model represented by the framework 100 shown in FIG. 1 is to provide an adaptive automated system by which individual devices throughout a monitored network (components 160) could be probed as desired to determine whether the precise security policy 120 is being specifically carried into effect with regard to the individual devices. It is a further objective of implementing an object model to provide specific logic that is not open to interpretation in testing the security of the network. Such an automated system may be available to provide the user with automated alerts regarding individual device non-compliance with the security policy implementation. At a higher level, with a specific logic breakdown such as that depicted in the exemplary framework 100 shown in FIG. 1, configuration control and update of the individual component devices could be automated and managed by the object model as well.

By way of example, the security policy 120 could be directed at managing anti-virus configurations of individual components in a networked system. Briefly, the risk 150 in such an instance may be considered data leakage, falsification, or destruction. The security policy 120 may be defined as, for example, providing correct and secure communications. The guideline 124 maybe to guard against malicious mobile codes. The procedure 126 may be used to isolate or quarantine certain types of codes. An individual actor 160 may be a specific employee whose task it is to ensure that routine update and operation of antivirus software in individual components 160 is undertaken. Given the detailed exemplary framework 100, if the requirement were to specify that an antivirus software is routinely run on each component 160, the object model does not necessarily have to track which individual antivirus software was being employed by each individual component 160, but would rather ensure that some measure of antivirus capability with respect to each component 160 was being undertaken.

Another common example may be to test the security of each individual component 160 by assessing, for example, a level of password protection for that individual component 160. Examples of such testing would be to review whether common passwords, such as "PASSWORD," are being employed in the specific component 160. These individual examples are intended to provide an illustration of order execution of an overall object model that may benefit the security policy implementation of an organization.

Figure 2:
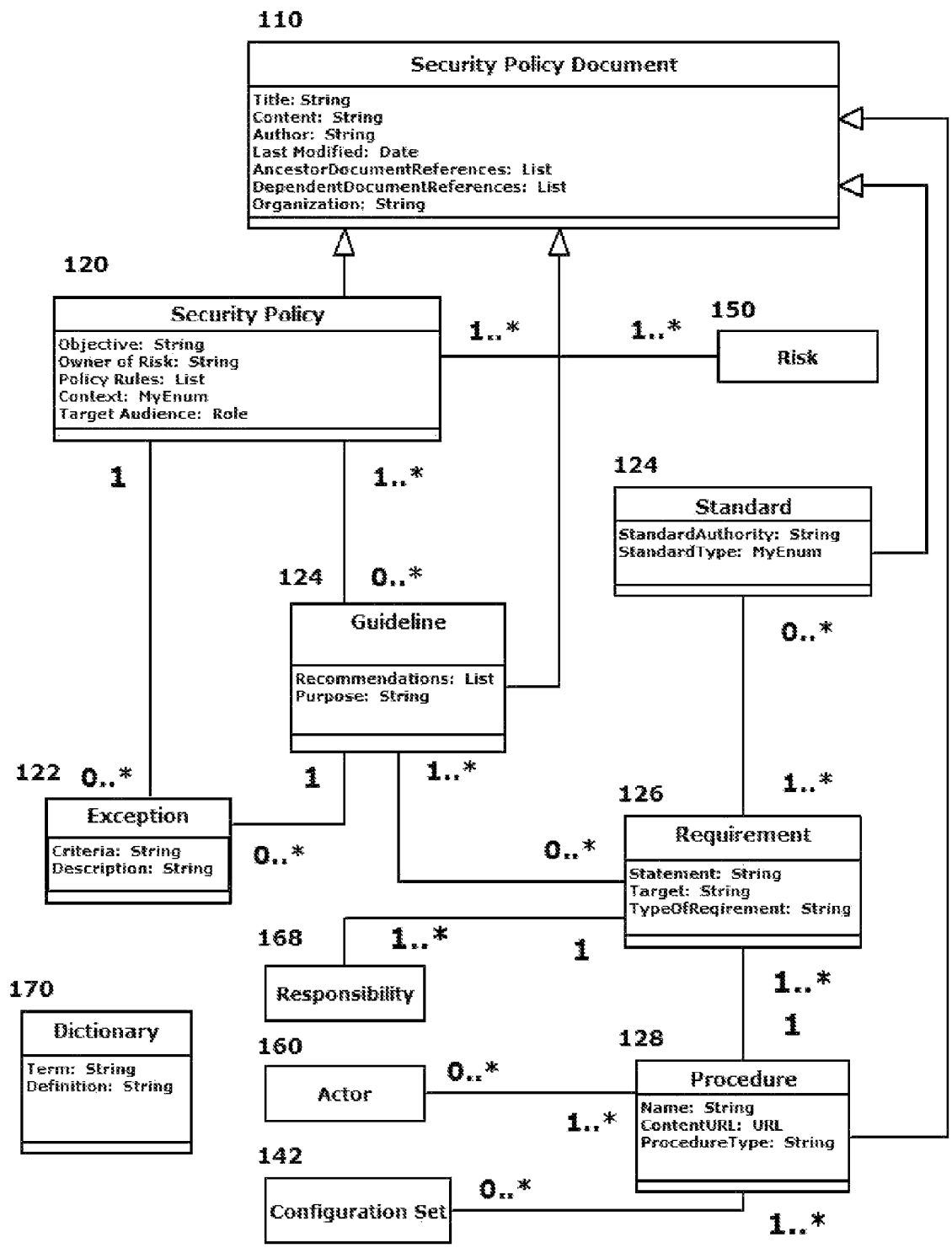
FIG. 2 illustrates a block diagram of additional detail in an object model format regarding the policy portion of the exemplary framework shown in FIG. 1.

FIG. 2 illustrates a block diagram of additional detail in an object model format regarding the policy portion of the exemplary framework shown in FIG. 1. FIG. 2 maintains the same numbering convention as FIG. 1. FIG. 2 provides more detail in class diagram form from UML to define, in a more detailed manner, certain of the relationships between individual elements shown in FIG. 1.

Element 110 now depicts, for example, that the name of the class is security policy document. The list of attributes is shown in the middle portion of element 110 as would be typical of a class diagram. Each of the other elements security policy 120, exceptions 122, guideline 124, requirement 126, procedure 128, and standard 130, as well as dictionary 170, are similarly depicted. One of skill in the art familiar with UML, and its model principles, can easily interpret not only the general relationships depicted in FIG. 2, but also the depicted indications of specified multiplicities, e.g., "1," "0 . . . *" and "1 . . . *" between individual elements. The association relationships, as should be generally understood by those of reasonable familiarity with UML modeling, indicate, in each instance, that the two related classes generally make reference to each other. The depicted multiplicities of instances are intended to better define relationships between elements by indicating that, for example, a relationship in one direction may have exactly one instance while a relationship in another direction may have zero or more instances, or one or more instances, as appropriate. Elements shown in FIG. 1 that are on the periphery the additional detail regarding the policy portion of the exemplary framework 100 shown in FIG. 1 are depicted in FIG. 2 with only their specific relationships to the policy portion indicated.

Figure 3:
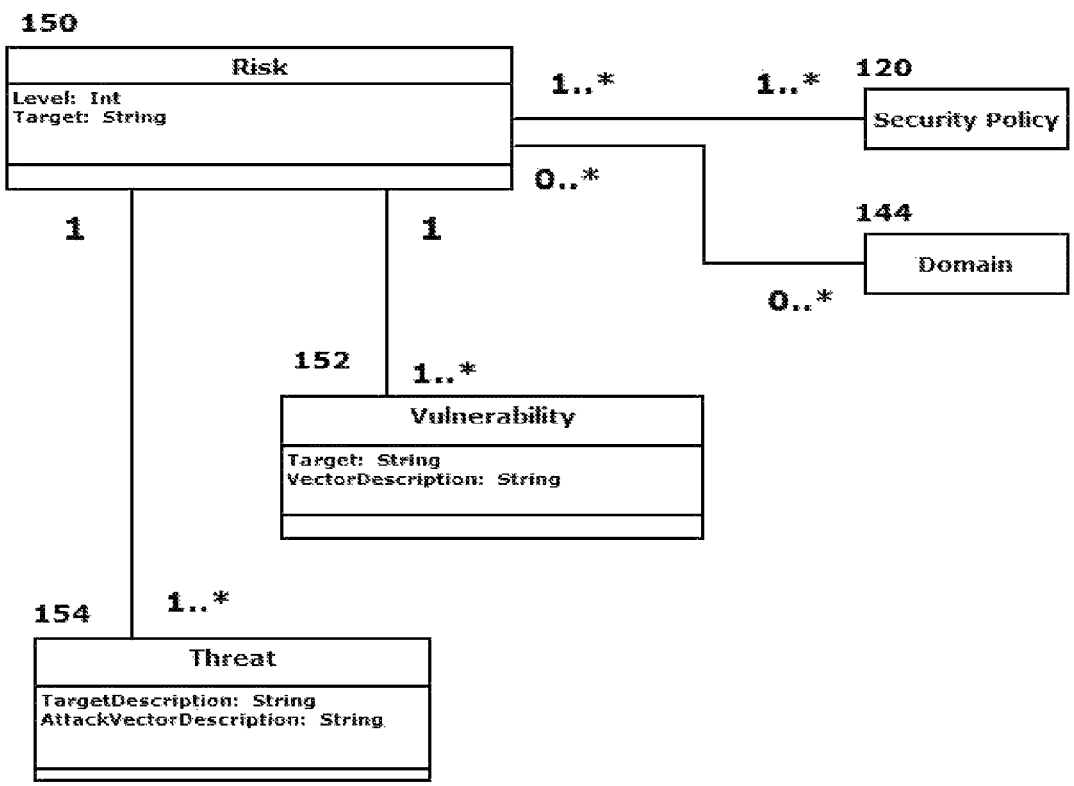
FIG. 3 illustrates a block diagram of additional detail in an object model format regarding the threat portion of the exemplary framework shown in FIG. 1.

FIG. 3 illustrates a block diagram of additional detail regarding the threat portion of the exemplary framework 100 shown in FIG. 1. Elements shown in FIG. 1 that are on the periphery the additional detail regarding the threat portion of the exemplary framework 100 shown in FIG. 1 are depicted in FIG. 3 with only their specific relationships to the threat portion indicated.

Figure 4:
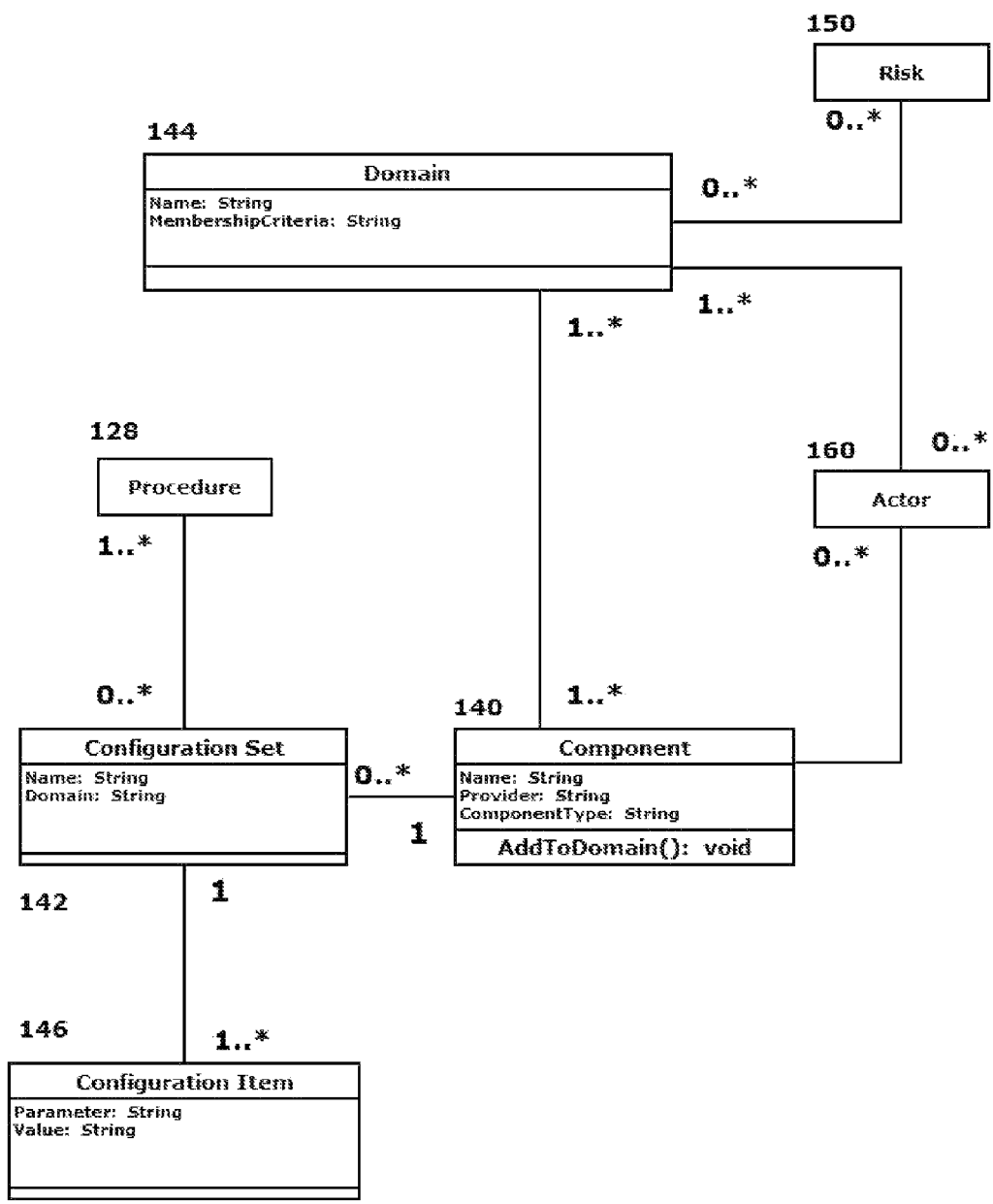
FIG. 4 illustrates a block diagram of additional detail in an object model format regarding the action portion of the exemplary framework shown in FIG. 1.

FIG. 4 illustrates a block diagram of additional detail regarding the action portion of the exemplary framework 100 shown in FIG. 1. Elements shown in FIG. 1 that are on the periphery the additional detail regarding the action portion of the exemplary framework 100 shown in FIG. 1 are depicted in FIG. 4 with only their specific relationships to the action portion indicated.

Figure 5:
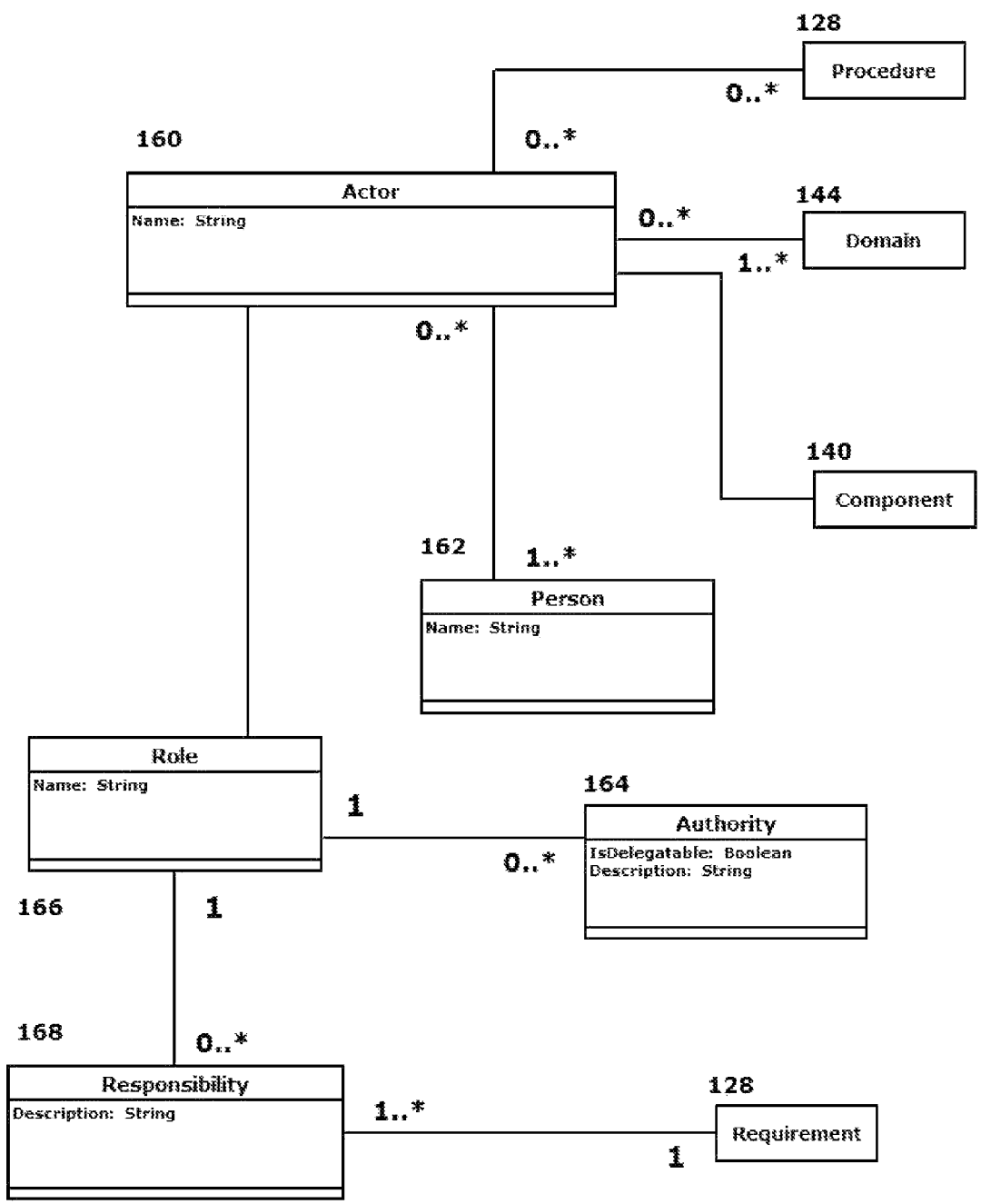
FIG. 5 illustrates a block diagram of additional detail in an object model format regarding the actor portion of the exemplary framework shown in FIG. 1.

FIG. 5 illustrates a block diagram of additional detail regarding the actor portion of the exemplary framework shown in FIG. 1. Elements shown in FIG. 1 that are on the periphery the additional detail regarding the actor portion of the exemplary framework 100 shown in FIG. 1 are depicted in FIG. 5 with only their specific relationships to the actor portion indicated.

The detail provided in FIGS. 3-5 is illustrative of the detail that may be provided in an exemplary object model according to the exemplary framework 100 for security implementation shown in FIG. 1. The detail provided in these figures, as with the detail provided in FIG. 2, should be considered illustrative and not limiting.

Figure 6:
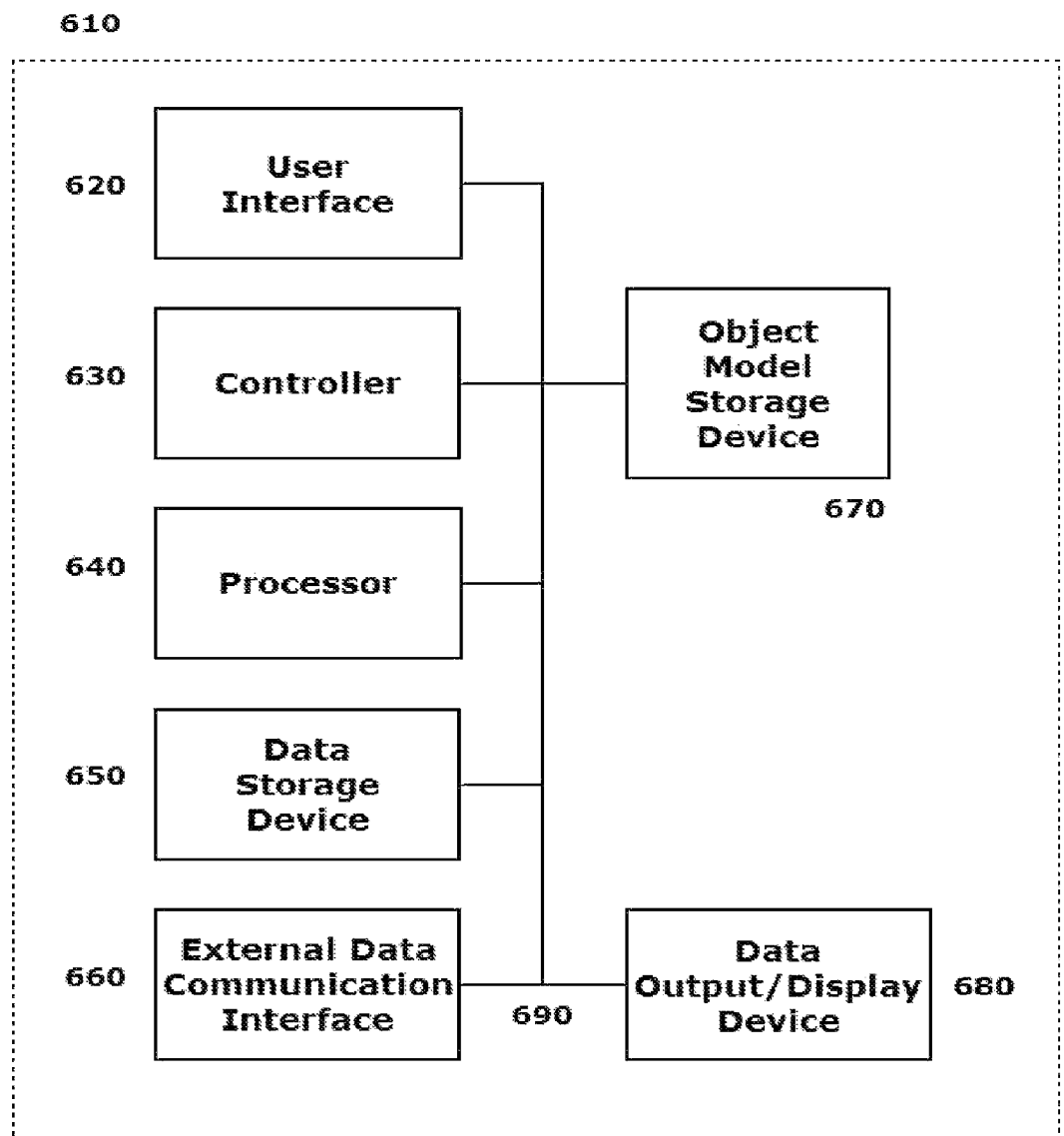
FIG. 6 illustrates a block diagram of an exemplary system for implementing a security policy model according to this disclosure.

FIG. 6 illustrates a block diagram of an exemplary system 610 for implementing a security policy model according to this disclosure.

The exemplary system 610 shown in FIG. 6 may be embodied in a specific network security monitoring module, or may otherwise reside in one or more servers of an organization's computing and information exchange network. Portions of the exemplary system 610 shown in FIG. 6 may be housed in a remote location, such as a remote server with which the organization's network is in communication. An objective of the systems and methods according to this disclosure is to provide an appropriate level of computing framework to support a detailed object model, in support of an unambiguous and verifiable security policy implementation.

The system 610 may include one or more user interfaces 620 by which one or more users may communicate with the system 610. The user interface 620 may be configured as one or more conventional mechanisms that permit a user to input information to the system 610. The user interface 620 may include, for example, an integral or attached keyboard and/or mouse by which a user can enter data into the system 610. The user interface 620 may alternatively include one or more data exchange devices such as, for example, a connectable data source or other like device for user operation of and data exchange with, the system 610.

An objective of the user interface 620, or other like device, will be to provide a convenient manner by which the object model may be input into the system 610 and otherwise updated.

The system 610 may include one or more controllers 630 for controlling operation of the system 610 independent from the network to which the system 610 is attached for security policy implementation, or otherwise to facilitate interaction of the system 610 with the network.

The system 610 may also include one or more local processors 640 for individually carrying out processing functions necessary to implement security policy implementation and enforcement network-wide with reference to a stored object model. Processor(s) 240 may include at least one conventional processor or microprocessor that interprets a status of each of the individual components 160 (see FIG. 1) and carries into implementation the security policy 120 (see FIG. 1) by monitoring the individual components 160, overseeing an assessment and enforcement function according to the disclosed framework, and alerting a user of results of probes and/or updates of individual components 160 as monitored by the object model.

The system 610 may include one or more data storage devices 650. Such data storage devices 650 may be used to store data or operating programs to be used by the system 610, and specifically the controller 630 and/or processor 640. Data storage device(s) 650 may include a random access memory (RAM) or another type of dynamic storage device that stores information and instructions for execution by processor(s) 640. Data storage device(s) 650 may also include a read-only memory (ROM), which may include a conventional ROM device or another type of static storage device that stores static information and instructions for processor(s) 640. Further, the data storage devices 650 may be integral to the system 610, or may be provided external to, and in wired or wireless communication with, the system 210.

Data storage device(s) 650 may store such information as may be required to carry into effect the security policy represented by the object model. These data storage device(s) 650 may also be employed to store such data as may be required to develop reports, as appropriate, to report enforcement of the security policy in a verifiable manner.

The system 610 may include one or more external data communication interfaces 660 by which the system 610 may communicate with individual components 160 (see FIG. 1) of the monitored network to carry into effect the security policy represented by the object model. Such external data communication interfaces 660 may include any mechanism that facilitates direct communication, or communication via the network, with the individual components 160 (see FIG. 1) for the collection of data and the sharing of results of the processing undertaken by the system 610 at least in its monitoring or automated updating functions with respect to individually monitored components of the network. As such, external data communication interfaces 660 may be appropriately configured and include mechanisms as may be appropriate for assisting in communication with other devices and/or systems.

The system 610 may include a separate object model storage device 670 for specifically storing an appropriate object model as a separate storage device segregated from the other data storage device(s) 650 of the system 610. As with all of the components of the system 610, the object model storage device 670 may be housed locally as an integral part of the system 610, or may otherwise be provided separately and in communication with the system 610. Separate location of the object model storage device 670 may aid in securing the object model in a manner that may keep the object model from being readily accessed by any user who has access to the systems 610.

The system 610 may include at least one data output/display device 680 which may be configured as one or more conventional mechanisms that output information to the user, including a display for alerting a user to a status of the system, the object model and/or to any results and updates regarding enforcement of the security policy implementation within the network. The data output/display device 680 may separately be an output port for connection to a printer, a copier, a scanner, a multi-function device, or a remote storage medium, such as a memory in the form, for example, of a magnetic or optical disk with a corresponding disk drive in order to download information directly, for example, to such a device in the form of an appropriately formatted report on the status of security enforcement by the system 610 of a network information security policy using an appropriate object model.

All of the various components of the system 610, as depicted in FIG. 6, may be connected by one or more data/control busses 690. These data/control busses 690 may provide wired or wireless communication between the various components of the system 610, whether all of those components are housed integrally in, or are otherwise external, and connected to, the system 610.

It should be appreciated that, although depicted in FIG. 6 as an integral unit, the various disclosed elements of the system 610 may be arranged in any combination of sub-systems as individual components or combinations of components, integral to a single unit, or external to, and in wired or wireless communication with the single unit of the system 610. In other words, no specific configuration as an integral unit or as a support unit is to be implied by the depiction in FIG. 6.

Figure 7:
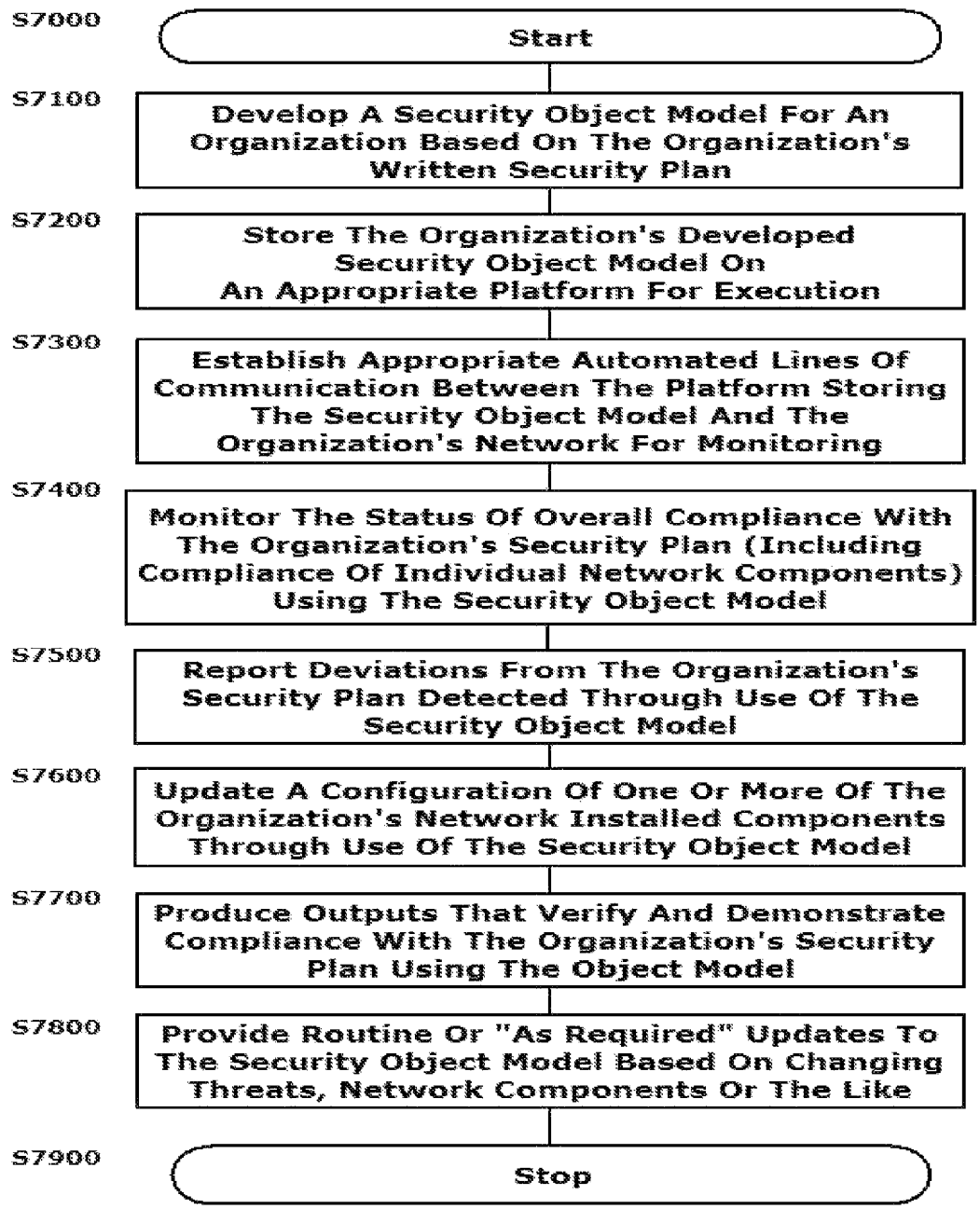
FIG. 7 illustrates a flowchart of an exemplary method for implementing a security policy using an appropriate object model according to this disclosure.

The disclosed embodiments may include an exemplary method for implementing a security policy using an appropriate object model. FIG. 7 illustrates a flowchart of such an exemplary method for implementing a security policy using an appropriate object model according to this disclosure. As shown in FIG. 7, operation of the method commences at Step S7000 and proceeds to Step S7100.

In Step S7100, an organization's security plan may be used to develop a detailed and unambiguous security object model for the organization. The security object model may advantageously employ any standardized general-purpose modeling language that may be applicable to the field of object-oriented software engineering. An example of such a standardized general-purpose modeling language is the commonly-understood Unified Modeling Language (UML). UML may be particularly adaptable to an organization's developed security object model as discussed in this disclosure. The ready adaptability of UML to this particular purpose should be considered an advantage, but not a requirement.

Objectives for the organization in developing a security object model include: (1) providing a baseline in resolving common language ambiguities based on varying interpretations of specific terms included in the organization's written security documents; (2) providing a system that may provide all security documents and security-related inter-connections in a single location; (3) enabling the capture and visualization of complex relationships required of the organization's detailed security plan; (4) providing metrics by which inconsistencies or gaps in the security implementation may be more easily detected; (5) attempting to ensure an unprecedented level of configuration control and management throughout the organization's network with a further goal of providing a highest level of verifiable security policy implementation throughout that network; and (6) providing a framework by which the effectiveness of implementation of the security policy can be reported and reviewed on a routine basis, including as may be required by some entity external to the organization demanding a verifiable report on security policy compliance by the organization. Operation of the method proceeds to Step S7200.

In Step S7200, the organization's developed security object model should be stored, or otherwise hosted, on an appropriate platform in communication with the organization's network in order to carry into effect the organization's security policy as represented by the developed security object model. Any appropriate computing platform, or a combination of computing platforms, that may host the developed security object model is contemplated. Operation of the method proceeds to Step S7300.

In Step S7300, appropriate automated lines of communication may be established between the host platform and the organization's network, either with the network as a whole, or with individual component parts of the network, in order to facilitate network monitoring by the developed security object model. Operation of the method proceeds to Step S7400.

In Step S7400, the developed security object model is applied by the host platform in communication with the organization's network, or individual components of the organization's network, in order to meet the above-specified objectives. Operation the method proceeds to Step S7500.

In Step S7500, the host system may provide a user with alerts regarding deviations from the organization's security plan as detected by application of the developed security object model for the organization. The alerts may be provided in any form that may be considered usable by the user according to common reporting techniques. Operation the method proceeds to Step S7600.

In Step S7600, the organization's developed security object model may be available to provide, or otherwise to direct, automated reconfiguration of a particular component of the network, or multiple network components, on a routine basis, while ensuring configuration control based on the organization's security policy is maintained throughout the network. This automated configuration control may be provided on a routine basis, or otherwise made usable to correct a detected deficiency in implementation of the organization's security policy uncovered through use of the developed security object model for the organization. Operation the method proceeds to Step S7700.

In Step 7700, outputs may be generated by the developed security object model via the host system in order to prove at least one of verification or demonstration of the organization's security policy compliance using the developed security object model. These outputs may be in the form of instantly-displayed alerts to a user presented on, for example, a display device associated with the host platform. Otherwise, these outputs may be in the form of detailed reports generated by the developed security object model to, for example, (1) score the effectiveness of implementation of the organization's security policy; or (2) provide useful visualization of the implementation of the organization's security policy that can be used in an enhanced verification and/or gap analysis role. Operation of the method proceeds to Step S7800.

In Step S7800, provision is made to provide routine, or "as required," updates to the organization's developed security object model. Such updates may be called for when threats change, individual system component configurations change, individual system components are added, or one organization's security policy must be updated to facilitate integration of that policy with the security policy of another organization. A mechanism is provided that may allow a routine review and update of the organization's developed security object model as differences in definitions of any of the factors related to that developed security object model change. Operation of the method proceeds to Step S7900 where operation of the method ceases.

The disclosed embodiments may include a non-transitory computer-readable medium storing instructions which, when executed by a processor, may carry into effect the steps of the method described in paragraphs [0071]-[0080] above.

The above-described exemplary systems and methods referenced certain conventional components to provide a brief, general description of a suitable communication and processing environment in which the subject matter of this disclosure may be implemented for familiarity and ease of understanding.

As has also been referenced throughout this disclosure, the above-described exemplary systems and methods may specific reference to use of UML as an exemplary language for development of the security object model according to this disclosure. No limitation to this specific language is intended, at least as noted above.

Although not required, embodiments of the disclosure may be provided, at least in part, in a form of hardware circuits, firmware or software computer-executable instructions to carry out the specific functions described, such as program modules, being executed by a processor. Generally, program modules include routine programs, objects, components, data structures, and the like that perform particular tasks or implement particular data types.

Those skilled in the art will appreciate that other embodiments of the invention may be practiced in communication network environments with many types of communication equipment and computer system configurations. Embodiments may also be practiced in distributed computing environments where tasks are performed by local and remote processing devices that are linked to each other by hardwired links, wireless links, or a combination of both through a communication network. In a distributed computing environment, program modules may be located in both local and remote memory storage devices.

Embodiments within the scope of the present disclosure may also include computer-readable media having stored computer-executable instructions or data structures that can be accessed, read and executed by, for example, the above-described system for carrying into effect an organization's security policy thru use of a developed security object model based on that policy. In this context, computer-readable media can be any available media that can be accessed by a processor, general purpose or special purpose computer in, or in communication with, the above-described host platform. By way of example, and not limitation, such computer-readable media can comprise RAM, ROM, EEPROM, CD-ROM, flash drives, data memory cards or other analog or digital data storage device that can be used to carry or store desired program elements or steps in the form of accessible computer-executable instructions or data structures. When information is transferred or provided over a network or another communications connection, whether wired, wireless, or in some combination of the two, the receiving processor properly views the connection as a computer-readable medium. Thus, any such connection is properly termed a computer-readable medium. Combinations of the above should also be included within the scope of the computer-readable media for the purposes of this disclosure.

Computer-executable instructions include, for example, non-transitory instructions and data that can be executed and accessed respectively to cause a network, or network-connected device, that is configured to store and host the developed security object model according to this disclosure, to perform certain of the above-specified functions, individually, or in combination. Computer-executable instructions also include program modules that are remotely stored for access by a computing platform to be executed by processors in that platform when that platform is caused to communicate in a network environment.

The exemplary depicted sequence of executable instructions or associated data structures represents one example of a corresponding sequence of acts for implementing the functions described in the steps. No particular order to the disclosed steps should be considered to be implied by the depiction in FIG. 7, or the accompanying description, except where any single step may be considered a necessary precondition to any other step.

Although the above description may contain specific details, they should not be construed as limiting the claims in any way. Other configurations of the described embodiments of the disclosed systems and methods are part of the scope of this disclosure. For example, the principles of the disclosure may be applied to a series of host platforms each operating dependently or independently of each other to carry into effect the function of implementing an organization's security policy through use of a developed security object model based on that policy. This enables organizations to use the benefits of the disclosure even if any one of the large number of possible applications do not need a specific aspect of the functionality described and depicted in this disclosure. In other words, there may be multiple instances of the components each processing the content in various possible ways. It does not necessarily need to be one system used by, for example, all end users. Accordingly, the appended claims and their legal equivalents should only define the disclosure, rather than any specific examples given.

We claim:

1. A method for automated implementation of an information security plan for a network, comprising:
    employing a standardized general-purpose modeling scheme to generate an object model from a written information security plan, elements forming the object model including at least identification of a risk, a security policy, a domain, a component within the domain and an actor;
    storing the generated object model in a data storage device associated with a processor;
    probing the network with the processor using the stored object model to determine network compliance with the information security plan; and
    outputting a result of the probing to a user, the output result employing the object model to display at least a visualization of relationships of the information security plan implementation to an individual component level in the network.

2. The method of claim 1, wherein the standardized general-purpose modeling scheme employs at least one of Unified Modeling Language (UML), Web Ontology Language (OWL), or any other formal modeling language capable of rendering the model computable.

3. The method of claim 1, the output result further comprising an alert to the user that the object model has detected that one or more components in the network is not in compliance with the information security plan.

4. The method of claim 1, further comprising:
    employing the object model to effect a change in configuration of one or more components in the network;
    applying the object model to assess an impact of the change on the network and other network components; and
    employing the object model to modify configurations of other network components to maintain compatibility with the change in configuration of the one or more components.

5. The method of claim 1, the output result further comprising a report of network compliance with the information security plan based on an overall network evaluation using the object model.

6. The method of claim 1, further comprising updating the object model when the information security plan changes.

7. The method of claim 1, wherein the generated object model is used to probe multiple networks.

8. The method of claim 1, wherein the probing the network uses the generated object model to assess at least of anti-virus and password compliance for individual components of the network.

9. A system for implementing an automated information security plan in a network, comprising:
    at least one storage device storing an object model that is generated using a standardized general-purpose modeling scheme and is based on the information security plan, elements forming the object model including at least identification of a risk, a security policy, a domain, a component within the domain and an actor;
    a processor that is programmed to use the stored object model to probe the network and to determine network compliance with the information security plan based on the use of the stored object model; and
    an output device that outputs a result of the probe of the network and the determination to a user, the output result employing the stored object model to display at least a visualization of relationships of the information security plan implementation to an individual component level in the network.

10. The system of claim 9, wherein the object model is one of a Unified Modeling Language (UML) object model, a Web Ontology Language (OWL) ontology or set of ontologies, or an object model in any formal modeling language capable of rendering the model computable.

11. The system of claim 9, the output device further outputting an alert to the user that application of the object model by the processor detected that one or more components in the network is not in compliance with the information security plan.

12. The system of claim 9, wherein the processor is further programmed to (1) employ the object model to effect a change in configuration of one or more components in the network, (2) apply the object model to assess an impact of the change in the configuration of one or more components, and (3) employ the object model to modify configurations of other network components to maintain compatibility with the change in configuration of the one or more components.

13. The system of claim 9, the output device further outputting a report of network compliance with the information security plan based on an overall evaluation of the network using the object model.

14. The system of claim 9, further comprising at least one of a user interface and an external data exchange port by which the user updates the object model.

15. The system of claim 9, the processor being further programmed to update the object model when the information security plan changes.

16. The system of claim 9, wherein the processor is connected to multiple networks to perform an evaluation of the multiple networks using the object model.

17. The system of claim 9, wherein the processor uses the object model to assess at least of anti-virus and password compliance for individual components of the network.

18. A non-transitory computer-readable medium storing instructions which, when executed by a processor, cause the processor to execute a method for automated implementation of an information security plan for a network, the method comprising:
    employing a standardized general-purpose modeling scheme to generate an object model from a written information security plan, elements forming the object model include at least identification of a risk, a security policy, a domain, a component within the domain and an actor;
    storing the generated object model in a data storage device associated with the processor;
    probing the network using the stored object model to determine network compliance with the information security plan; and
    outputting a result of the probing to a user, the output result employing the object model to display a visualization of relationships of the information security plan implementation to an individual component level in the network.

19. The non-transitory computer-readable medium of claim 18, the output result further comprising an alert to the user that the object model has detected that one or more components in the network is not in compliance with the information security plan.

20. The non-transitory computer-readable medium of claim 18, the method further comprising:
    employing the object model to effect a change in configuration of one or more components in the network;
    applying the object model to assess an impact of the change on the network and other network components; and
    employing the object model to modify configurations of the other network components to maintain compatibility with the change in configuration of the one or more components.

21. The non-transitory computer-readable medium of claim 18, the output result further comprising a report of network compliance with the information security plan based on an overall network evaluation using the object model.

22. The non-transitory computer-readable medium of claim 18, the method further comprising updating the object model when the information security plan changes.

23. The non-transitory computer-readable medium of claim 18, the generated object model being used to probe multiple networks.

* * * * *